(12) United States Patent
Gaiser et al.

(10) Patent No.: US 9,709,351 B2
(45) Date of Patent: *Jul. 18, 2017

(54) HEAT EXCHANGER

(71) Applicant: Eberspächer Exhaust Technology GmbH & Co. KG, Neunkirchen (DE)

(72) Inventors: Gerd Gaiser, Reutlingen (DE); Markus Birgler, Wernau (DE); Matthias Feuerbach, Esslingen (DE); Marc Hartmann, Rottenburg (DE); Jürgen Schweizer, Stuttgart (DE); Rouven Egger, Böblingen (DE); Dimitri Penner, Plochingen (DE); Fabian Frobenius, Esslingen (DE); Bernd Weller, Durlangen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 902 days.

This patent is subject to a terminal disclaimer.

(21) Appl. No.: 14/026,433

(22) Filed: Sep. 13, 2013

(65) Prior Publication Data

US 2014/0076293 A1    Mar. 20, 2014

(30) Foreign Application Priority Data

Sep. 14, 2012    (DE) .................... 10 2012 216 453

(51) Int. Cl.
*F02M 25/07*    (2006.01)
*F28F 27/00*    (2006.01)
(Continued)

(52) U.S. Cl.
CPC .............. *F28F 27/00* (2013.01); *F01N 3/043* (2013.01); *F01N 5/02* (2013.01); *F02M 26/28* (2016.02);
(Continued)

(58) Field of Classification Search
CPC ...... F28F 27/00; F28F 1/24; F28F 1/36; F28F 2250/06; F28D 21/0003; F28D 7/024;
(Continued)

(56) References Cited

U.S. PATENT DOCUMENTS 1,343,669 A * 6/1920 Funderburk ............ F28D 7/024
165/163
2,508,247 A    5/1950 Giauque

FOREIGN PATENT DOCUMENTS

DE    10 2008 014 169 A1    1/2009
DE    10 2009 041 773 A1    5/2011
(Continued)

*Primary Examiner* — Hung Q Nguyen
(74) *Attorney, Agent, or Firm* — McGlew and Tuttle, P.C.

(57) ABSTRACT

A heat exchanger (5) includes a housing (31), which contains a tube (32) and has a jacket (33), which surrounds the tube (32) while forming a ring channel (34). A primary inlet (35) and a primary outlet (36) are fluidically connected with one another via a primary path (37) carrying a primary medium through the ring channel (34) and via a bypass path (38) carrying the primary medium through the tube (32). A control (39) controls the flow of the primary medium through the primary path (37) and through the bypass path (38). At least two secondary inlets (42) and two secondary outlets (43) are fluidically connected with one another via at least two secondary paths (44) for carrying at least one secondary medium. The primary path (37) is coupled with the secondary paths (44) in a heat-transferring manner and such that the media are separated from one another.

16 Claims, 12 Drawing Sheets

(51) Int. Cl.
*F01N 3/04* (2006.01)
*F01N 5/02* (2006.01)
*F28D 7/02* (2006.01)
*F28F 1/36* (2006.01)
*F28D 7/00* (2006.01)
*F28D 21/00* (2006.01)
*F28F 1/24* (2006.01)
*F02M 26/28* (2016.01)
*F02M 26/32* (2016.01)

(52) U.S. Cl.
CPC ........... *F02M 26/32* (2016.02); *F28D 7/0066* (2013.01); *F28D 7/024* (2013.01); *F28D 21/0003* (2013.01); *F28F 1/24* (2013.01); *F28F 1/36* (2013.01); *F01N 2240/02* (2013.01); *F01N 2240/36* (2013.01); *F01N 2410/00* (2013.01); *F28F 2250/06* (2013.01); *Y02T 10/16* (2013.01); *Y02T 10/20* (2013.01)

(58) Field of Classification Search
CPC ........ F01N 3/043; F01N 5/02; F01N 2240/02; F01N 2410/00; F01N 2240/36; Y02T 10/121; Y02T 10/16; Y02T 10/20
USPC ............................................ 123/495; 60/320
See application file for complete search history.

(56) References Cited

FOREIGN PATENT DOCUMENTS

JP 2010-091 128 A 4/2010
WO 2011/153 179 A1 12/2011

\* cited by examiner

HEAT EXCHANGER

CROSS REFERENCE TO RELATED APPLICATIONS

This application claims the benefit of priority under 35 U.S.C. §119 of German Patent Application DE 10 2012 216 453.7 filed Sep. 14, 2012, the entire contents of which are incorporated herein by reference.

FIELD OF THE INVENTION

The present invention pertains to a heat exchanger as well as to a device that is equipped with such a heat exchanger.

BACKGROUND OF THE INVENTION

Heat exchangers, which make it possible to transfer heat between a first medium and a second medium, are used in various fields of industry and are generally known.

Applications in vehicles are of particular significance, because the heat exchangers require a compact and inexpensive design for this. A plurality of heat exchangers may be used in vehicles, which have an internal combustion engine for driving the vehicle, for example, in one or more cooling circuits for cooling an engine block of the internal combustion engine, for cooling lubricating oil, for cooling charge air and for cooling recirculated exhaust gas.

To make it possible to better utilize the heat contained in the exhaust gas of the internal combustion engine, waste heat utilization units are known, which operate in the manner of a Rankine cycle, preferably a Rankine-Clausius cycle, so that a working medium is evaporated, expanded, condensed and compressed, and the expansion of the compressed, evaporated and superheated working medium is used to generate mechanical energy, for example, in order to drive a generator for power generation. The evaporation of the working medium is carried out here by means of an evaporator, which likewise corresponds to a heat exchanger. This heat exchanger or evaporator may be integrated, for example, in a suitable manner in an exhaust system of the internal combustion engine in order to transfer heat from the exhaust gas to the working medium to evaporate the working medium.

SUMMARY OF THE INVENTION

An object of the present invention is to provide an improved embodiment, which is characterized especially by an efficient heat transfer along with compact design for a heat exchanger of the above-described type and for a device equipped therewith.

According to the invention, a heat exchanger is provided with a housing comprising a tube and a jacket. The jacket surrounds the tube and forms a ring channel with the tube. The heat exchanger includes a primary inlet and a primary outlet, which are fluidically connected with one another via a primary path carrying a primary medium through the ring channel and via a bypass path carrying the primary medium through the tube. A control means (control) is provided for controlling the flow of the primary medium through the primary path and through the bypass path. The heat exchanger includes at least two separate secondary inlets and at least two separate secondary outlets. The at least two separate secondary inlets and the at least two separate secondary outlets are fluidically connected with one another via at least two separate secondary paths for carrying at least one secondary medium. The primary path is coupled with the secondary paths in a heat transferring manner and such that the media are separated.

The present invention is based on the general idea of providing at least two separate secondary paths for at least one secondary medium, which said secondary paths fluidically connect separate secondary inlets in parallel with separate secondary outlets with one another, in a heat exchanger, which has a primary path for a primary medium, which said primary path connects a primary inlet and a primary outlet with one another. Due to the fact that at least two secondary paths are provided, through which a secondary medium can flow in parallel and which are both coupled with the primary path in a heat-transferring manner and such that the media are separated, heat transfer can be achieved between a plurality of circuits carrying a medium each, for example, between a circuit releasing heat and at least two circuits absorbing heat, along with a compact design. On the whole, increased efficiency can be achieved as a result for the heat transfer between the primary medium and the respective secondary medium, and a compact design can be obtained at the same time. A very large quantity of heat can also be removed from the heat-releasing primary medium, because two streams of heat-absorbing secondary medium are available at the same time.

The heat exchanger thus created can be especially advantageously integrated for this, for example, into an exhaust gas-carrying line of an internal combustion engine, such that the exhaust gas forms the primary medium. The exhaust gas of an internal combustion engine can reach, depending on the operating state of the internal combustion engine, a very high temperature, so that a large quantity of heat can be removed from the exhaust gas by means of the heat exchanger being presented here to heat the respective secondary medium. This can be achieved in an especially efficient manner and with a compact design by means of the heat exchanger being presented here, because the flow of the secondary medium to be heated takes place in parallel through the at least two secondary paths, so that the heat can be absorbed in parallel.

To embody the heat exchanger, the present invention specifically proposes according to a preferred embodiment a type of tubular construction, in which a housing contains a tube and has a jacket, which surrounds the tube while forming a ring channel. The primary path is passed through the ring channel, while a bypass path, which likewise connects the primary inlet fluidically with the primary outlet while bypassing the ring channel, is passed through the tube. Furthermore, a control means is proposed, by means of which the flow of the primary medium through the primary path and the bypass path can be controlled. The at least two secondary paths are likewise passed through the ring channel, such that they are coupled in the ring channel with the primary path in a heat-transferring manner and such that the media are separated. Due to this mode of construction, the heat transfer between the primary medium and the respective secondary medium takes place exclusively in the ring channel, so that an effective heat transfer to the respective secondary medium takes place only if primary medium flows through the ring channel. Primary medium, which flows through the bypass path, bypasses this heat-transferring coupling between the primary path and the secondary paths and can lead at best to a passive heat transfer to the respective secondary medium, which is based, e.g., on heating of the housing by the exhaust gas stream. The primary medium can now be controlled by means of the control means, so that it flows either only through the primary path, i.e., through the ring channel, or only through the tube. According to a preferred embodiment of the control means, at least one intermediate position may also be able to be set, in which the primary medium flows through both the primary path and the bypass path, as a result of which the quantity of heat that can be transferred to the respective secondary medium can be controlled.

The mode of construction of the heat exchanger being presented here is characterized by an extremely compact geometry and a design that can be manufactured at a low cost. The tubular design being presented here, in which the tube and the jacket have round cross sections and extend cylindrically, permits relatively high pressures on the primary side, as a result of which the use of the heat exchanger on the primary side in the exhaust gas stream is facilitated.

The common housing can be advantageously designed such that it has at least two separate secondary inlets and at least two separate secondary outlets for the at least two secondary paths. As a consequence, the respective secondary medium can be sent separately through the at least two secondary paths, so that it flows in parallel through the secondary paths. It is possible, in principle, to use at least two different secondary mediums; the use of only one secondary medium is conceivable as well, but this secondary medium circulates especially in at least two different circuits.

Corresponding to an advantageous embodiment, at least two coils may be provided, which are arranged in the ring channel, wind helically around the tube and one secondary path each is passed through them. The use of such coils embodies relatively long secondary paths for the secondary medium, as a result of which relatively long residence times can be obtained within the heat exchanger or within the ring channel, which facilitates intensive heat transfer. Provisions may be made in this connection for at least two coils to be associated with the same secondary medium. The total cross section through which flow is possible and which is available for the respective secondary medium can be significantly increased hereby, as a result of which the flow resistance for the secondary medium and, along with this, a pressure loss during the flow through the heat exchanger can be reduced.

To improve the heat transfer between the primary medium and the respective secondary medium, each coil may have, according to an advantageous embodiment, a spiral tube, which carries the respective secondary medium inside and carries cooling fins exposed to the primary medium on the outside. Such cooling fins can be embodied, for example, by means of a plurality of disk-shaped elements, which are pressed onto the coiled tubing or are soldered or welded thereto. Such cooling fins may likewise be embodied by means of at least one helical strip element, which helically envelopes the respective spiral tube. Such coils can likewise be subjected to relatively high pressures on the inside as well as on the outside, which simplifies the use of the heat exchanger in an exhaust gas stream on the primary side and, e.g., in a waste heat utilization circuit on the secondary side.

According to another advantageous embodiment, the at least two coils may be arranged in the ring channel radially one over the other or one on the other. The heat exchanger can have an extremely compact design in the axial direction due to this mode of construction. Due to the coils being arranged radially one over the other or on one another, loops located on the inside are present, which belong to a coil located on the inside or to a coil section located on the inside and which are located at a directly spaced location from the tube, while other loops of another coil or of another coil section are arranged between these loops located on the inside and the jacket. There likewise exist loops located on the outside, which belong to a coil located on the outside or to a coil section located on the outside and which are directly adjacent to the jacket, while loops of another coil or of another coil section are arranged between these loops located on the outside and the tube.

In case exactly two coils are provided, the loops located on the inside are arranged directly adjacent to the tube and, via the loops located on the outside, indirectly adjacent to the jacket, while the loops located on the outside are arranged directly adjacent to the jacket and, via the loops located on the inside, indirectly adjacent to the tube. In case of three or more coils, which are arranged radially one over the other or on one another, there exist additional intermediately arranged loops, which are arranged in at least one intermediate layer, which is located between the loops located on the inside and the loops located on the outside, in addition to the loops located on the inside and the loops located on the outside.

According to an advantageous variant, the at least two coils may form each at least two axially adjacent coil bundles, in which a coil section comprising a plurality of loops extends from each coil. The radial position of the loops of the respective coil section is the same within the same coil bundle. However, the radial positions of the loops of the same coils in the adjacent coil bundles are different. In an embodiment with only two coils, this means, for example, that at least two axially adjacent coil bundles are present, in which two coil sections each are arranged radially one over the other. The loops located on the inside form a first coil section of the first coil within the first coil bundle, while the loops located on the outside form a first coil section of the second coil. By contrast, the loops located on the inside form a second coil section of the second coil in the second coil bundle, while the loops located on the outside form a second coil section of the first coil. Thus, each coil has a coil section located on the inside with loops located on the inside and a coil section located on the outside with loops located on the outside. The radial positions of the loops of the same coil are thus varied from one coil bundle to the next. On the whole, homogenization of the heat transfer from the primary medium to the respective secondary medium can be achieved due to this mode of construction. This mode of construction is based on the discovery that a coil located farther on the outside embodies a longer secondary path in coils arranged radially one over the other than does a coil located farther on the inside, as a result of which the respective secondary medium will have different residence times in the heat exchanger, as a result of which different heat absorptions are brought about by the different secondary paths. The heat absorption of the different secondary paths can be homogenized by alternating the radial positions of the loops, which belong to the same coil and hence to the same secondary path.

Especially advantageous is here an embodiment in which if n corresponds to the number of coils, at least n coil bundles are provided, in which n different radial positions are possible for the loops, and the loops of the coil sections assume every possible radial position at least once in each coil. This means that in case of exactly three coils, i.e., in case of exactly three secondary paths, at least three coil bundles are provided, in which exactly three different radial positions are possible for the loops, namely, loops located on the inside, loops located on the outside and loops arranged in the middle. Furthermore, this means that at least one coil section with loops located on the inside, one coil section with loops located on the outside and one coil section with loops located in the middle are provided in each of these three coils in the at least three coil bundles.

A connection tube, which fluidically connects a coil section of one coil bundle, which said coil section is located radially farther inside, with a coil section of the other coil bundle, which said coil section is located farther outside, may be provided per coil between adjacent coil bundles in another advantageous variant. This makes it possible, in principle, to design the individual coil bundles as identical coil bundles and to connect them by means of the connection tubes such that the aforementioned arrangement is obtained, in which the individual coil sections of the same radial position in adjacent coil bundles belong to different coils.

To make it possible to connect these connection tubes fluidically with the spiral tubes in an especially simple manner, it is possible to provide, for example, connection sleeves, into which, for example, end sections of the spiral tubes and of the connection tubes can be plugged axially. In particular, such connection sleeves can be simply soldered to the connection tubes and the spiral tubes.

According to another advantageous embodiment, which can be embodied in addition or as an alternative to the above variants, the at least two coils may differ from each other by different heat transfer capacities. It is possible as a result to more or less compensate differences in heat transfer between a coil located farther on the inside or a coil section located farther on the inside and a coil located farther on the outside or a coil section located farther on the outside.

For example, the coils may differ from each other by different cross sections through which flow is possible. In particular, the spiral tubes used may have different flow cross sections. For example, a coil located farther on the outside may have a larger cross section through which flow is possible than a coil located farther on the inside.

In addition or as an alternative, provisions may be made for the coils to differ from one another by a difference in the number of loops. The number of loops defines the length of the respective secondary path, so that coils with secondary paths of different lengths can be embodied hereby. For example, a coil located farther outside may have a smaller number of loops than a coil located farther inside. A corresponding statement may also be made for coil sections within one coil bundle.

In addition or as an alternative, provisions may be made for coils that have a spiral tube with cooling fins for the coils to differ from one another by a different size of the cooling fins and/or by a different density with which the cooling fins are arranged and/or by a different geometry of the cooling fins and/or by different materials of the cooling fins. A different density with which the cooling fins are arranged corresponds to a different number of cooling fins per unit of length of the spiral tube. Different materials of the cooling fins and/or of the spiral tubes differ by different coefficients of thermal conductivity. The different shapes and/or arrangements of the cooling fins significantly affect the heat transfer capacity of the respective coil, so that the desired homogenization can be achieved hereby an especially simple manner.

Furthermore, provisions may generally be made, in addition or as an alternative, for the coils to differ from each other by different materials. The different materials are characterized especially by different coefficients of thermal conductivity.

All coils may be arranged radially one over the other in a special embodiment, so that axially adjacent loops belong to the same coil within the respective radial position. In particular, the aforementioned coil bundles can be embodied hereby in an especially simple manner.

By contrast, provisions may be made in another embodiment for at least two coils to be arranged in the manner of a double coil or multiple coil axially intertwined in one another at least in a position located radially farther on the outside, so that loops of different coils are arranged axially next to each other within this radial position. Due to the use of at least two coils in a position located radially farther on the outside, the number of loops can be reduced there by at least half compared to a single coil, as a result of which the length of the respective secondary path can be correspondingly reduced as well.

Provisions may be made in another advantageous embodiment for at least two coils in the ring channel to be arranged in the manner of a double coil or multiple coil axially intertwined next to each other. This measure causes at least two coils to extend in parallel to one another within the same radial position, as a result of which uniform heat transfer to the secondary medium becomes established.

Preferred here is a variant in which all coils in the ring channel are arranged one inside the other, so that the loops of all coils are located in the same radial position. All loops are arranged directly adjacent to both the tube and the jacket in this case.

Depending on the conditions of use, the materials preferably used for the housing, especially the tube and the jacket, as well as for the coils, especially for the respective spiral tube and for the cooling fins, are preferably iron alloys, preferably steel, especially stainless steel. Furthermore, it is also possible to use light metal alloys, e.g., aluminum or aluminum alloys. Copper or a copper alloy may also be used as an alternative. The surfaces exposed to the exhaust gas may also be provided with a protective coating, especially a ceramic protective coating, for protection against corrosive exhaust gas. Coils made of copper may be preferably provided with such a protective coating on the outside.

A device according to the present invention, which may be arranged especially in a vehicle, namely, both in a land craft and in a watercraft or in an aircraft, comprises an internal combustion engine, which has a fresh air feed unit for feeding fresh air to combustion chambers of the internal combustion engine and an exhaust system for removing exhaust gas from the combustion chambers as well as optionally an exhaust gas-recirculating unit for recirculating exhaust gas from the exhaust system to the fresh air feed unit. Furthermore, such a device is equipped with a first cooling circuit, in which a first cooling medium circulates, and with a second cooling circuit, in which a second cooling medium circulates. Finally, such a device is equipped with a heat exchanger of the above-described type. This heat exchanger is integrated into the device such that the primary path is integrated into the exhaust system or into the exhaust gas-recirculating unit, so that the exhaust gas or the recirculated exhaust gas forms the primary medium. The secondary paths are integrated, by contrast, into the two cooling circuits, such that the first cooling medium forms a first secondary medium, while the second cooling medium forms a second secondary medium. Especially efficient utilization of the heat being entrained in the recirculated exhaust gas can be achieved in this device by means of the heat exchanger being presented here.

In addition to the at least two cooling circuits or instead of such a cooling circuit or instead of both cooling circuits, such a device may be equipped with a waste heat utilization unit, which has, in a waste heat utilization circuit, in which a working medium circulates, an evaporator for evaporating the working medium, downstream therefrom an expansion engine for evaporating the working medium, downstream therefrom a condenser for condensing the working medium and downstream therefrom a feed means for driving the working medium in the waste heat utilization circuit. The heat exchanger can be integrated in this case into the device such that the primary path is integrated into the exhaust system or into the exhaust gas-recirculating unit, so that the exhaust gas or the recirculated exhaust gas forms the primary medium. At least one of the secondary paths or all secondary paths may be integrated, by contrast, into the waste heat utilization circuit, such that the working medium forms the respective secondary medium. In addition, at least one of the secondary paths may also be integrated into one of the cooling circuits mentioned, such that the cooling medium forms the respective secondary medium. Especially efficient utilization or recovery of the heat being carried in the exhaust gas or in the recirculated exhaust gas can be achieved in this device by means of the heat exchanger being presented here.

In case the heat exchanger is used on the secondary side in the waste heat utilization circuit, the heat exchanger operates as an evaporator, whereas it operates as a cooler in case of use on the secondary side in the cooling circuit. In case the heat exchanger is used as a cooler, it is preferably used on the primary side in the exhaust gas-recirculating unit in order to efficiently bring about the desired cooling of the recirculated exhaust gas there.

An engine cooling circuit, which is used to cool a conventional exhaust gas-recirculating cooler, can be considerably relieved in case of a heat-transferring coupling of exhaust gas recirculation with the waste heat utilization circuit by means of such a heat exchanger. The total quantity of energy that can be removed from the exhaust gas via the heat exchanger acting as an evaporator does not have to be absorbed by the engine cooling circuit any more.

Furthermore, it is possible to equip the device with at least two such heat exchangers, wherein one of them may now be arranged on the primary side in the exhaust system and the other on the primary side in the exhaust gas-recirculating unit. The two heat exchangers may be connected independently from one another on the secondary side. It is also conceivable to connect the two heat exchangers in series on the secondary side, for example, in order to evaporate the working medium of the waste heat utilization circuit in the heat exchanger through which it flows first and to superheat it in the heat exchanger through which it flows next.

It is apparent that the above-mentioned features, which will also be explained below, may be used not only in the particular combination indicated, but in other combinations or alone as well, without going beyond the scope of the present invention.

Preferred exemplary embodiments of the present invention are shown in the drawings and will be explained in more detail in the following description, in which identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
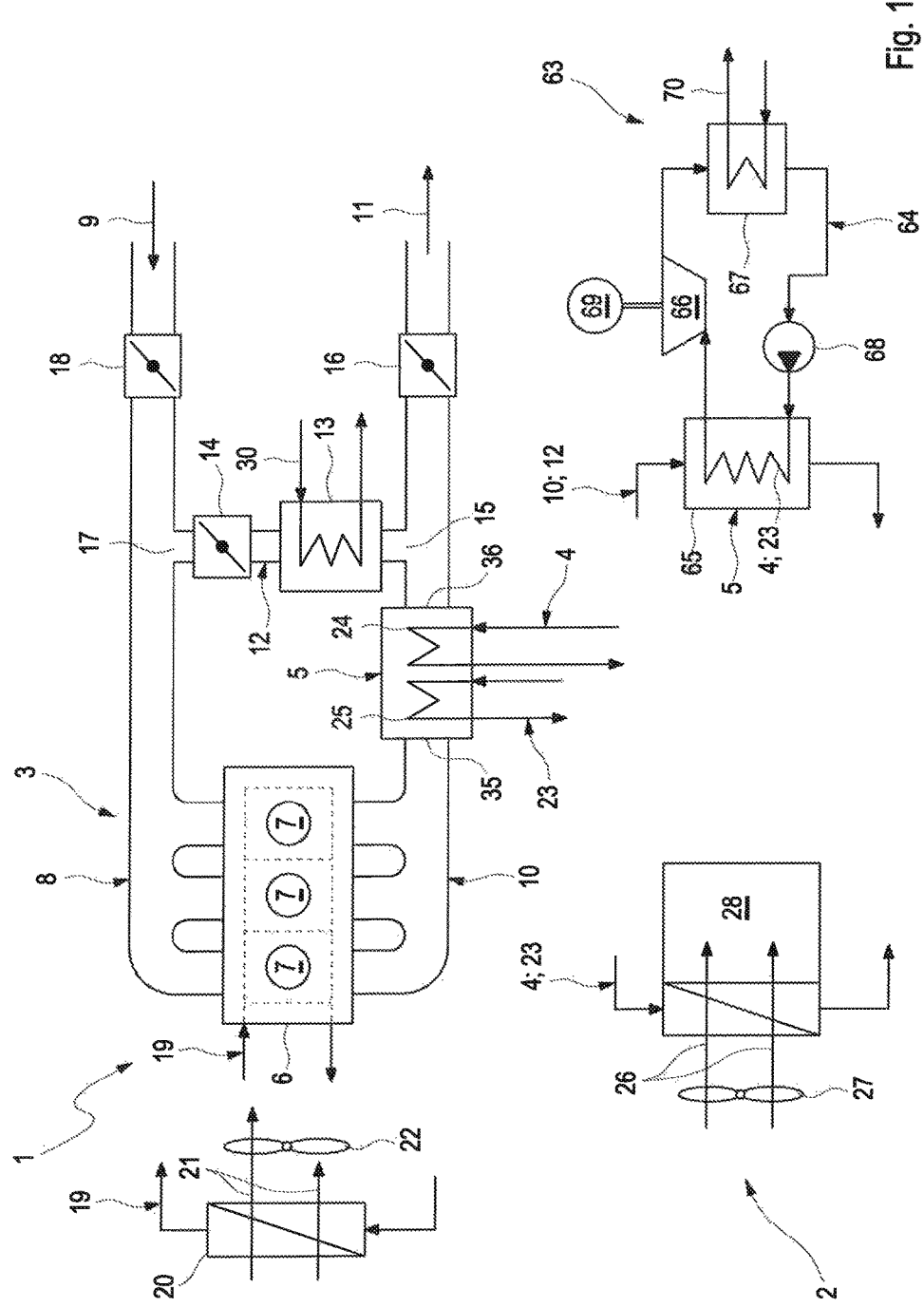
FIG. 1 is a highly simplified, block diagram-like, schematic view of a vehicle with a device having a heat exchanger showing one of different embodiments.
Figure 2:
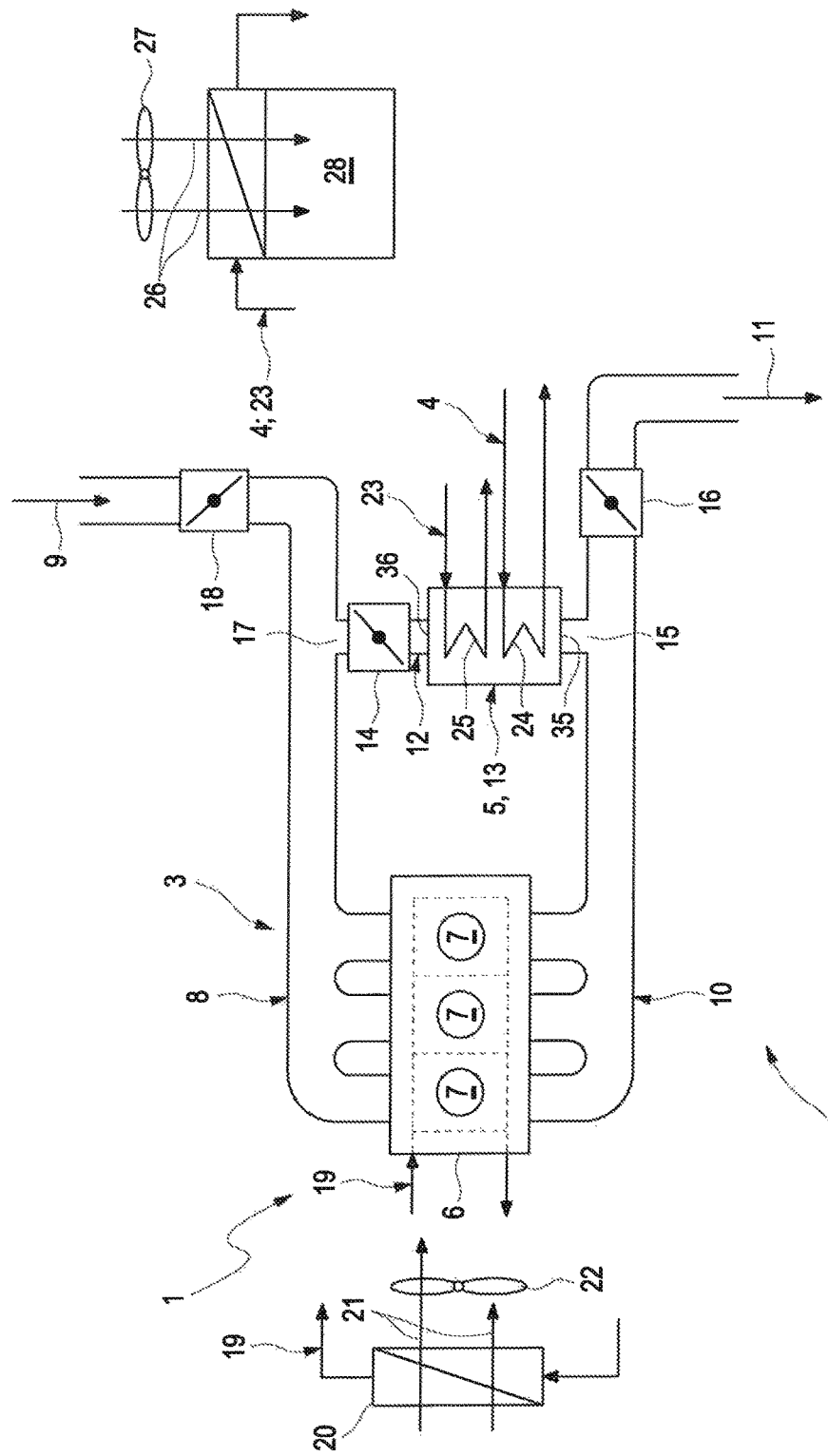
FIG. 2 is a highly simplified, block diagram-like, schematic view of a vehicle with a device having a heat exchanger showing another of different embodiments.

Referring to the drawings in particular, corresponding to FIGS. 1 and 2, a vehicle 1, which may be preferably a land craft, especially a road vehicle, but which may also be a watercraft or an aircraft, may have a device 2, which comprises an internal combustion engine 3, a first cooling circuit 4, a second cooling circuit 23 and a heat exchanger 5.

The internal combustion engine 3 has an engine block 6, which contains a plurality of combustion chambers 7, which are formed in cylinders, and in which pistons are arranged with adjustable strokes. The internal combustion engine 3 comprises, furthermore, a fresh air feed unit for feeding fresh air to the combustion chambers 7. A corresponding fresh air flow is indicated by an arrow 9. The internal combustion engine 3 is equipped, besides, with an exhaust system 10 for removing exhaust gas from the combustion chambers 7. A corresponding exhaust gas stream is indicated by an arrow 11. In addition, the internal combustion engine 3 is equipped in the embodiments being shown here with a exhaust gas-recirculating unit 12, which is used to recirculate exhaust gas from the exhaust system 10 to the fresh air feed unit 8. The exhaust gas-recirculating unit 12 contains an exhaust gas-recirculating cooler 13 to cool the recirculated exhaust gas as well as a exhaust gas-recirculating valve 14 to control the recirculated quantity of exhaust gas, i.e., to set an exhaust gas recirculation rate. To improve the exhaust gas recirculation, the exhaust system 10 may have a dynamic pressure valve 16 downstream of a connection site 15, in which the exhaust gas-recirculating unit 10 is connected to the exhaust system 10. The fresh air feed unit 8 may have a throttle valve 18 upstream of a connection site 17, at which the exhaust gas-recirculating unit 12 is connected to the fresh air feed unit 8.

To cool the engine block 6, the internal combustion engine 3 has an engine cooling circuit 19, which is passed through the engine block 6 corresponding to broken lines and which contains a cooler 20. A cooling air flow 21, which is generated during travel of the vehicle 1 by the so-called relative wind and which may also be generated or intensified by means of a blower 22, can be admitted to and flow through cooler 20.

A first cooling medium circulates in the first cooling circuit 4. The first cooling circuit 4 may be integrated, for example, into the engine cooling circuit 19 or form a part thereof. A first cooler 24, via which heat can be supplied to the first cooling medium, for example, in order to supply heat to the engine block 6 for a warm-up operation of the internal combustion engine 3, is provided in the first cooling circuit 4.

A second cooling medium circulates in the second cooling circuit 23. The second cooling circuit 23 may be integrated, for example, into a lubricating coil circuit, which supplies the internal combustion engine 3 or the components thereof, e.g., a transmission, with lubricating oil. A second cooler 25, via which heat can be supplied to the second cooling medium, for example, in order to supply heat to the lubricating oil for a warm-up operation of the internal combustion engine 3, is provided in the second cooling circuit 23.

It is also possible that the first cooling circuit 4 or the second cooling circuit 23 is used to heat an air flow 26 indicated by arrows, which, driven, for example, by a blower 27, can be fed to a passenger compartment 28 of the vehicle 1 in order to air condition or heat same. Furthermore, other forms of application are conceivable for such a cooling circuit 4, 23 in a vehicle 1.

Heat exchanger 5 now forms the two coolers 24, 25 in one component, so that heat exchanger 5 is integrated into both cooling circuits 4, 23. The two cooling circuits 4, 23 are integrated into the heat exchanger 5 on the secondary side, i.e., on the heat-absorbing side, while the heat exchanger is integrated into the exhaust system 10 on the primary side, i.e., on the heat-releasing side of the heat exchanger 5 into the exhaust system 10 in the embodiment shown in FIG. 1 and into the exhaust gas-recirculating unit 12 in the embodiment shown in FIG. 2.

In the embodiment shown in FIG. 1, the exhaust gas forms a primary medium, which flows through the heat exchanger 5. The first cooling medium of the first cooling circuit 4 now forms a first secondary medium, which flows through the heat exchanger 5 and is coupled therein with the primary medium, i.e., with the exhaust gas, in a heat-transferring manner and such that the media are separated. Furthermore, the second cooling medium of the second cooling circuit 23 forms here a second secondary medium, which flows through the heat exchanger 5 and is coupled therein with the primary medium, i.e., with the exhaust gas, in a heat-transferring manner and such that the media are separated.

Contrary to this, FIG. 2 shows an embodiment in which the heat exchanger 5 is integrated into the exhaust gas-recirculating unit 12, such that the heat exchanger 5 forms the exhaust gas-recirculating cooler 13 in the exhaust gas-recirculating unit 12. The primary medium of the heat exchanger 5 is thus formed by the recirculated exhaust gas in this case, while the two secondary media of the heat exchanger 5 are again formed by the two cooling media of the two cooling circuits 4, 23.

Device 2 may optionally be equipped according to FIG. 1 with a waste heat utilization unit 63, which comprises a waste heat utilization circuit 64, in which a working medium circulates. The waste heat utilization unit 63 preferably operates according to a Rankine-Clausius cycle and correspondingly contains in its waste heat utilization circuit 64, following each other in the direction of flow of the working medium, an evaporator 65, an expansion engine 66, a condenser 67 and a feed means 68. Evaporator 65 is used to evaporate the working medium, Expansion engine 66 is used to expand the evaporated and preferably superheated working medium, while the expansion engine 66 converts heat and pressure into mechanical energy, for example, in order to drive a generator 69. Generator 69 generates electric power, which can be stored, for example, in a suitable energy storage means, preferably a battery. The expanded working medium can be condensed in condenser 67. Condenser 67 is connected for this to a cooling circuit 70, which may be integrated especially into the engine cooling circuit 19 and/or into the first cooling circuit 4 and/or into the second cooling circuit 23 and/or into cooling circuit 30. The feed means 68 drives the working medium in the waste heat utilization circuit 64. At the same time, the feed means 68 can admit a comparatively high pressure to the liquid working medium.

If such a waste heat utilization unit 63 is present, heat exchanger 5 can be integrated at least with one of its secondary paths 44 into the waste heat utilization circuit 64, such that at least one such secondary medium is formed by the working medium. In addition, heat exchanger 5 is integrated into the exhaust system 10 (FIG. 1) or into the exhaust gas-recirculating unit 12 (FIG. 2) such that the exhaust gas or the recirculated exhaust gas forms the primary medium. The heat-transferring coupling between the exhaust gas or the recirculated exhaust gas and the working medium will now form the evaporator 65 within the heat exchanger 5 in this case. The two cooling circuits 4, 23 are combined in FIG. 2 for a simplified view. It is clear that at least one of the cooling circuits 4, 23 is formed by the waste heat utilization circuit 64 in this case.

Corresponding to FIGS. 3, 4, 8 through 10, 13 and 15, heat exchanger 5 comprises a housing 31, which contains a tube 32 and has a jacket 33. Jacket 33 encloses the tube 32 at a radially spaced location, so that a ring channel 34 is formed radially between tube 32 and jacket 33. A primary inlet 35 and a primary outlet 36 are formed on housing 31. Furthermore, housing 31 contains a primary path 37, which fluidically connects the primary inlet 35 and the primary outlet 36 with one another and which carries a primary medium, for example, the exhaust gas of the internal combustion engine 3 according to the embodiment shown in FIG. 1 or the recirculated exhaust gas according to the embodiment shown in FIG. 2 through the ring channel 34. Ring channel 34 thus defines the primary path 37. Contrary to this, tube 32 defines a bypass path 38, which likewise connects fluidically the primary inlet 35 with the primary outlet 36 and which carries the primary medium through tube 32.

Figure 3:
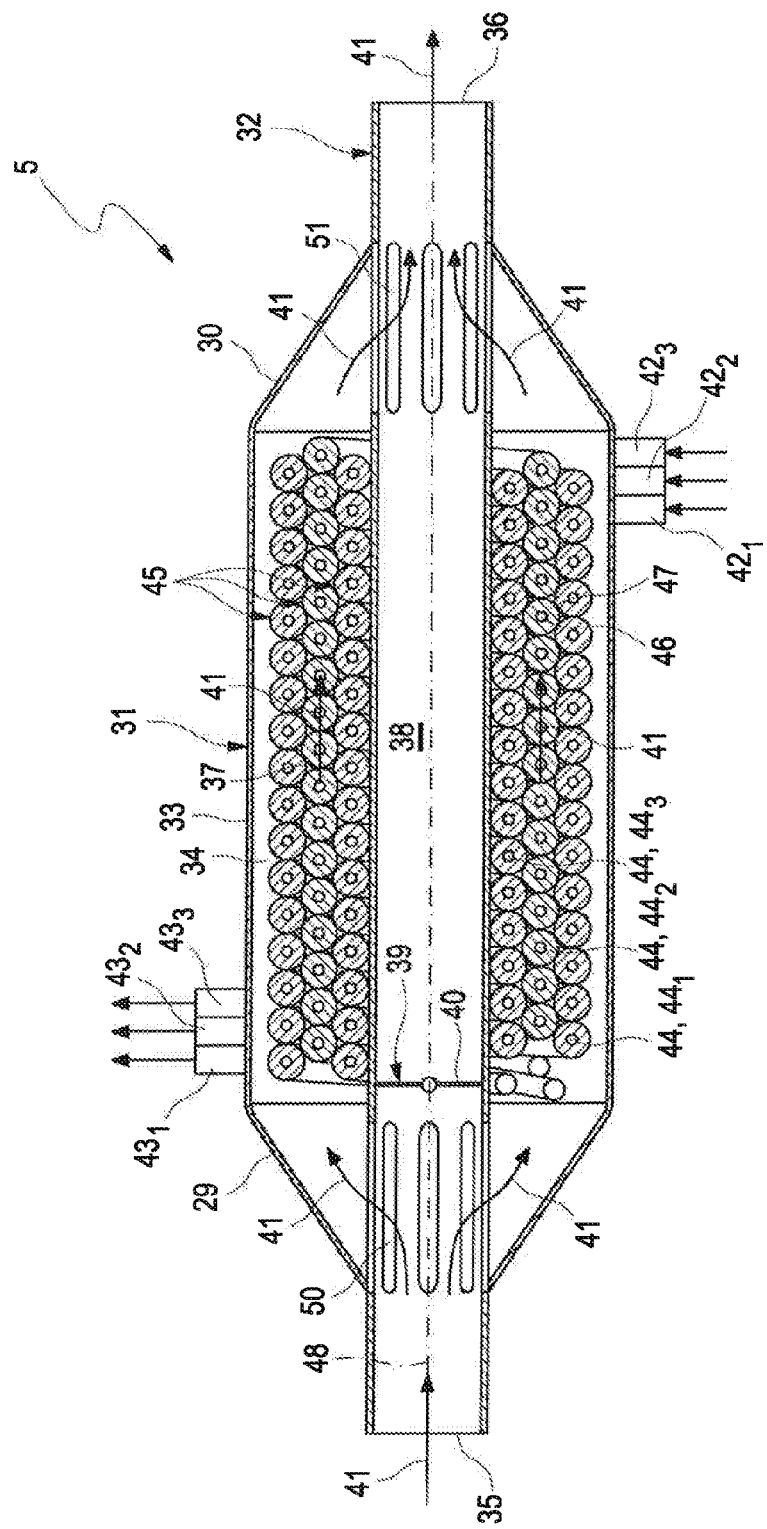
FIG. 3 is a highly simplified longitudinal sectional view through the heat exchanger showing one of different operating states.
Figure 4:
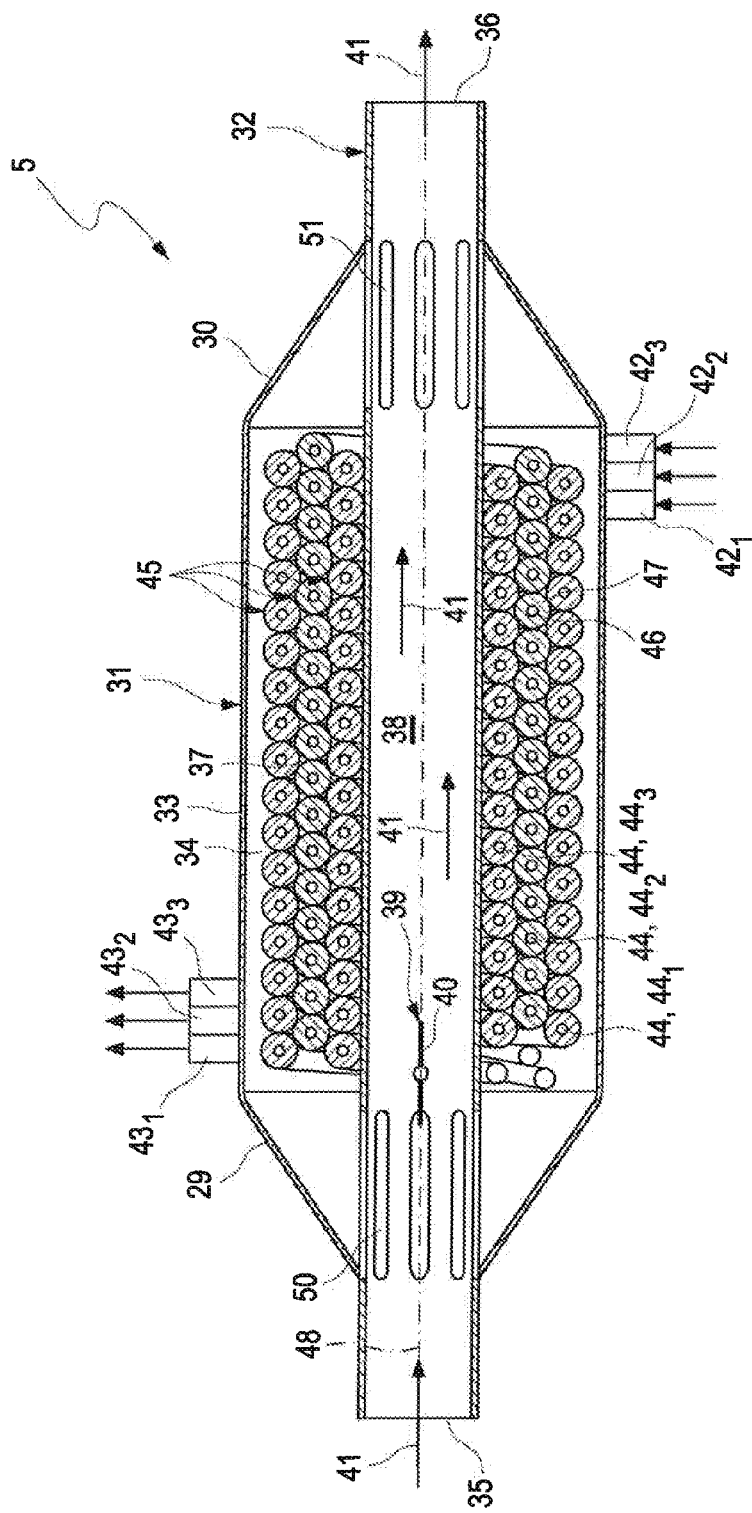
FIG. 4 is a highly simplified longitudinal sectional view through the heat exchanger showing another of different operating states.
Figure 5:
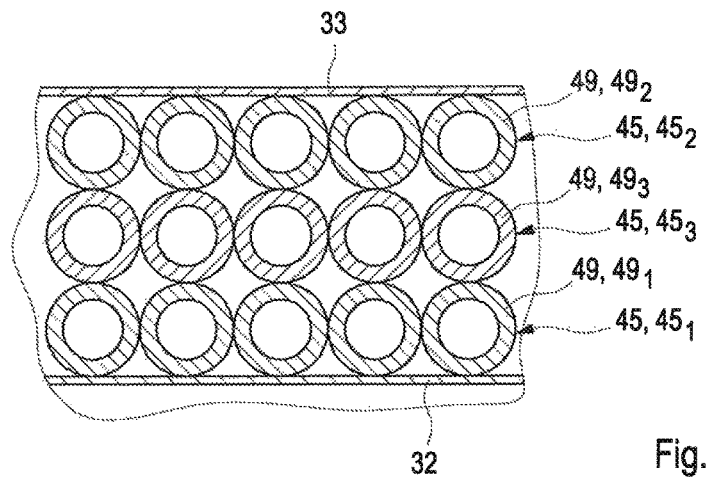
FIG. 5a is an enlarged detail longitudinal sectional view showing the heat exchanger in the area of a plurality of coils, arranged radially one over the other, in one of different embodiments.
FIG. 5b is an enlarged detail longitudinal sectional view showing the heat exchanger in the area of a plurality of coils, arranged radially one over the other, in another of different embodiments.
Figure 5:
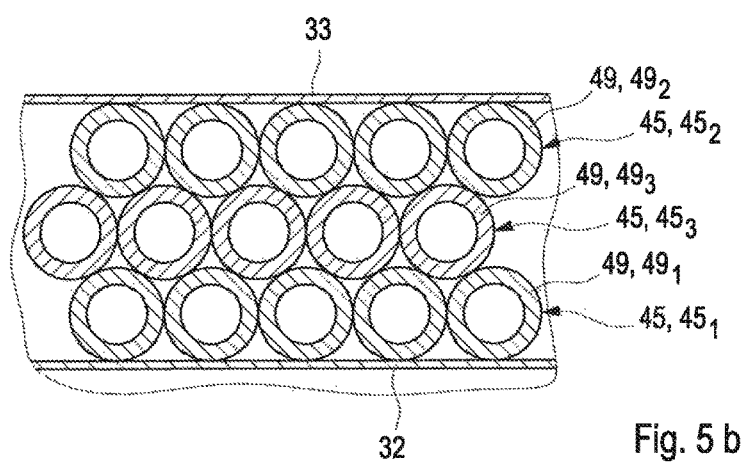
Figure 6:
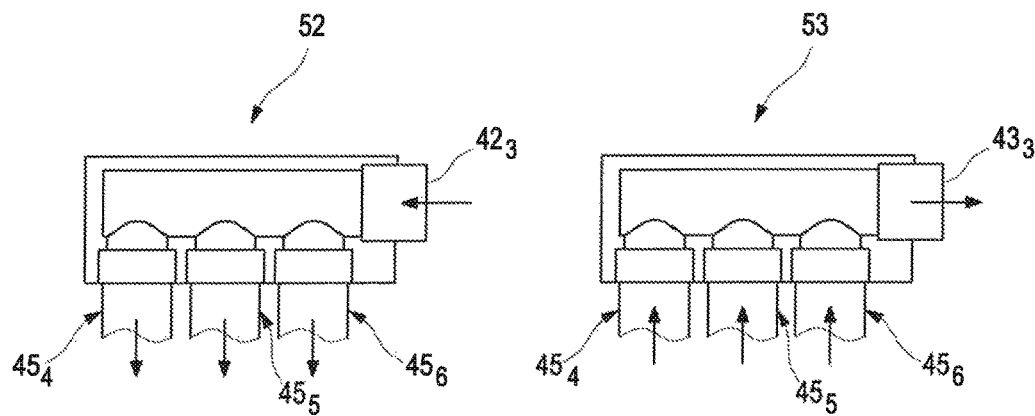
FIG. 6a is a simplified sectional view of a distributor element.
FIG. 6b is a simplified sectional view of a collector element.

Heat exchanger 5 is equipped, besides, with a control means 39, by means of which the flow of the primary medium through the primary path 37 and the bypass path 38 can be controlled. For example, control means 39 comprises for this a control element 40, preferably a flap, which is arranged in tube 32 and by means of which a cross section of the tube 32, through which cross section flow is possible, can be changed. For example, FIG. 3 shows a closed position of the control element 40, in which the cross section of tube 32, through which cross section flow is possible, is extensively closed, so that the exhaust gas follows the primary path 37 according to arrows 41 and correspondingly flows through ring channel 34. Contrary to this, FIG. 4 shows a state in which the control element 40 is adjusted into an open position, in which it maximally releases the cross section of the tube 32, through which cross section flow is possible. Since tube 32 has a markedly lower flow resistance than the ring channel 34, the exhaust gas flows in this case corresponding to arrows 41 nearly exclusively through tube 32 and correspondingly follows bypass path 38. The control element is indicated by respective solid lines in its closed position in FIGS. 8 through 10, 13 and 15, while a broken line indicates the open position of control element 40. It is clear that the control means 39 may also set at least one intermediate position, preferably any desired intermediate position, in order to make it possible to set a desired flow split between the primary path 37 and the bypass path 38 depending on the needs.

Jacket 33 is connected in the examples being shown here with the primary inlet 35 and with tube 32 via an inlet funnel 29 and with the primary outlet 36 or with the tube 32 via an outlet funnel 30.

Heat exchanger 5 is equipped, besides, with a plurality of secondary inlets 42 and a plurality of secondary outlets 43, which are fluidically connected with one another via a plurality of secondary paths 44, wherein said secondary paths 44 carry a secondary medium each. The respective secondary medium is formed by the first and second cooling agents of the two cooling circuits 4, 23 in the examples shown in FIGS. 1 and 2. The secondary paths 44 are likewise passed through the ring channel 34, such that a heat-transferring coupling with the media separated is obtained between the primary path 37 and the secondary paths 44. The separate secondary inlets 42 are indicated by subscripts in the figures corresponding to their number, so that a first secondary inlet $42_1$, a second secondary inlet $42_2$ and optionally third secondary inlet $42_3$ are provided. This also applies to the separate secondary outlets 43 and to the separate secondary paths 44, so that a first secondary outlet $43_1$, a second secondary outlet $43_2$ and optionally third secondary outlet $43_{34}$ are present, just as a first secondary path $44_1$, a second secondary path $44_2$ and optionally a third secondary path $44_3$.

According to FIGS. 3 through 15, the secondary paths 44 are formed by means of at least two coils 45. These coils 45 are arranged in ring channel 34 and wind helically around tube 32. Each coil 45 carries a secondary path 44. The coils 45 are formed each by means of a spiral tube 46, which extends in a helical pattern and which carries the secondary medium, i.e., contains the respective secondary path 44 and which carries cooling fins 47, which are exposed to the primary medium, on the outside.

FIGS. 3 through 9 now show embodiments in which at least two coils are arranged in ring channel 34 radially one over the other. The radial direction refers to a longitudinal axis 48 of the straight jacket 33 and of the straight tube 32. Tube 32 and jacket 33 are advantageously of a cylindrical shape. Tube 32 and jacket 33 may have a round cross section each, which may be circular or oval or elliptical, in all embodiments.

The individual coils 45 have a plurality of loops, which wind around tube 32 and are designated by 49 in FIGS. 5a and 5b. Due to the coils 45 being arranged radially one over another, there are, according to FIGS. 5a and 5b, inner loops $49_1$ of an inner coil $45_1$, which are directly adjacent to tube 32. Furthermore, there are outer loops $49_2$ of an outer coil $45_2$, which are directly adjacent to jacket 33. If, as in the embodiments being shown here, more than two coils 45 are provided, there also exist at least one middle coil $45_3$, which has middle loops $49_3$, which are only indirectly adjacent to both tube 32 and jacket 33, namely, always via an inner loop $49_1$ and an outer loop $49_2$.

According to FIG. 5a, the radially adjacent coils 45 may be arranged radially flush in respect to their loops 49. A more compact mode of construction is obtained according to FIG. 5b if the radially adjacent coils 45 are each arranged axially offset in relation to one another by half the loop cross section.

In order for the primary to be able to be split quasi as desired between the primary path 37 and the bypass path 38 depending on the position of control element 40, tube 32 is designed as a continuous tube in the embodiments being shown here, so that it is connected directly to the primary inlet 35 and the primary outlet 36 or forms these. Tube 32 has, furthermore, especially in inlet funnel 29, a perforated, here slotted inlet area 50 and, especially in outlet funnel 30, a perforated, here slotted outlet area 51, as a result of which a fluidic connection is created between tube 32 and ring channel 34. Inlet area 50 is now located upstream of the coils 45, while the outlet area 51 is located downstream of the coils 45. With the control element 40 opened, the flow resistance of the ring channel 34 is so high through the coils 45 arranged in ring channel 34 that the primary medium flows nearly exclusively through tube 32, which has a markedly lower flow resistance.

Figure 15:
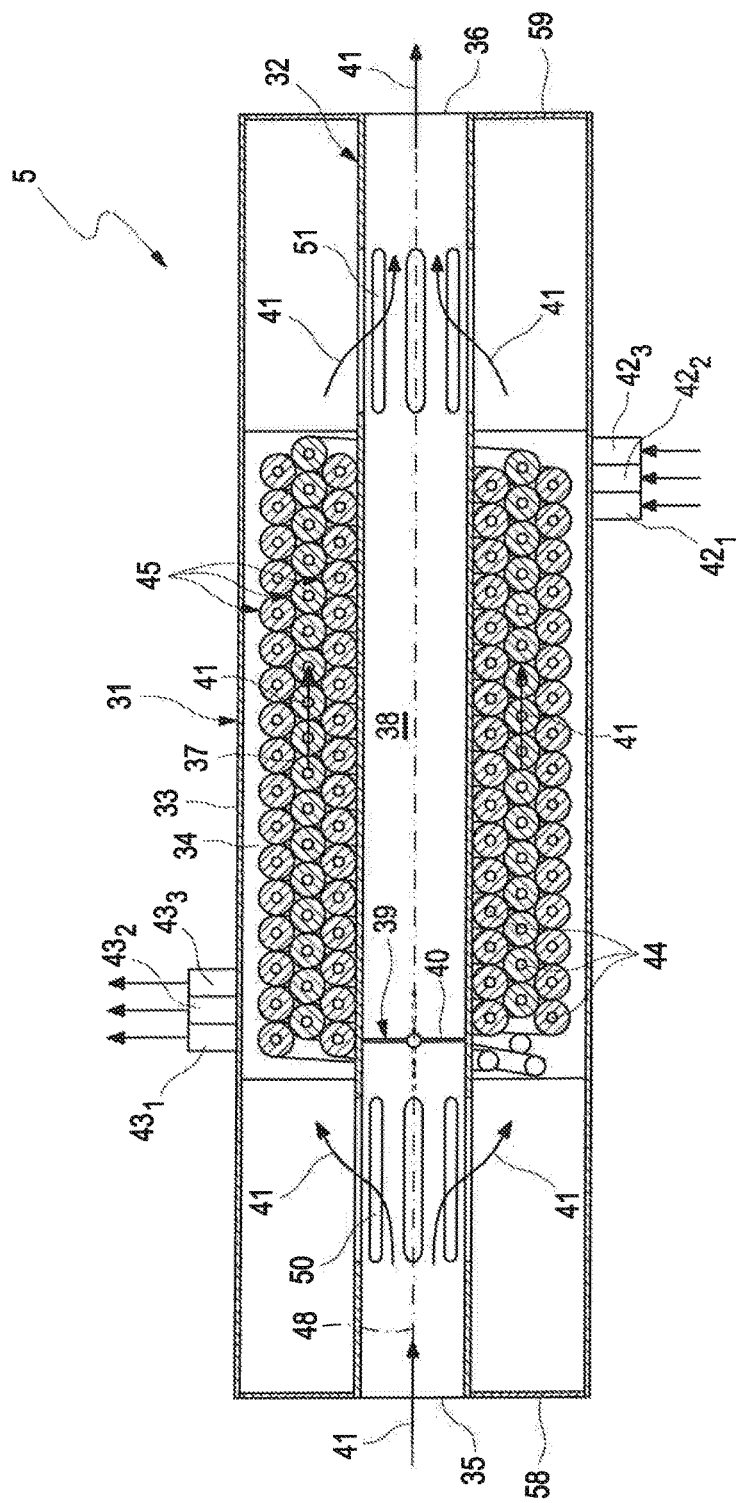
FIG. 15 is a simplified longitudinal sectional view of the heat exchanger in another embodiment.

In the examples according to FIGS. 3, 4, 8 through 10 and 13, housing 31 has an inlet funnel 29, which forms the inlet-side transition from tube 32 to jacket 33 and in which the perforated inlet area 50 is located, as well as an outlet funnel 30, which forms the outlet-side transition from tube 32 to jacket 33 and in which the perforated outlet area 51 is located. Contrary to this, FIG. 15 shows an embodiment that has an inlet-side end bottom 58 or inlet end bottom 58 instead of inlet funnel 29 and an outlet-side end bottom 59 or outlet end bottom 59 instead of the outlet funnel 30, which said bottoms define the front-sided ends of housing 31 and which are fastened to jacket 33, for example, by means of beading. The jacket 33 and the tube 32 are not connected directly with one another in this case. Jacket 33 covers in this case both the gas-permeable inlet area 50 and the gas-permeable outlet area 51 in the axial direction.

Figure 7:
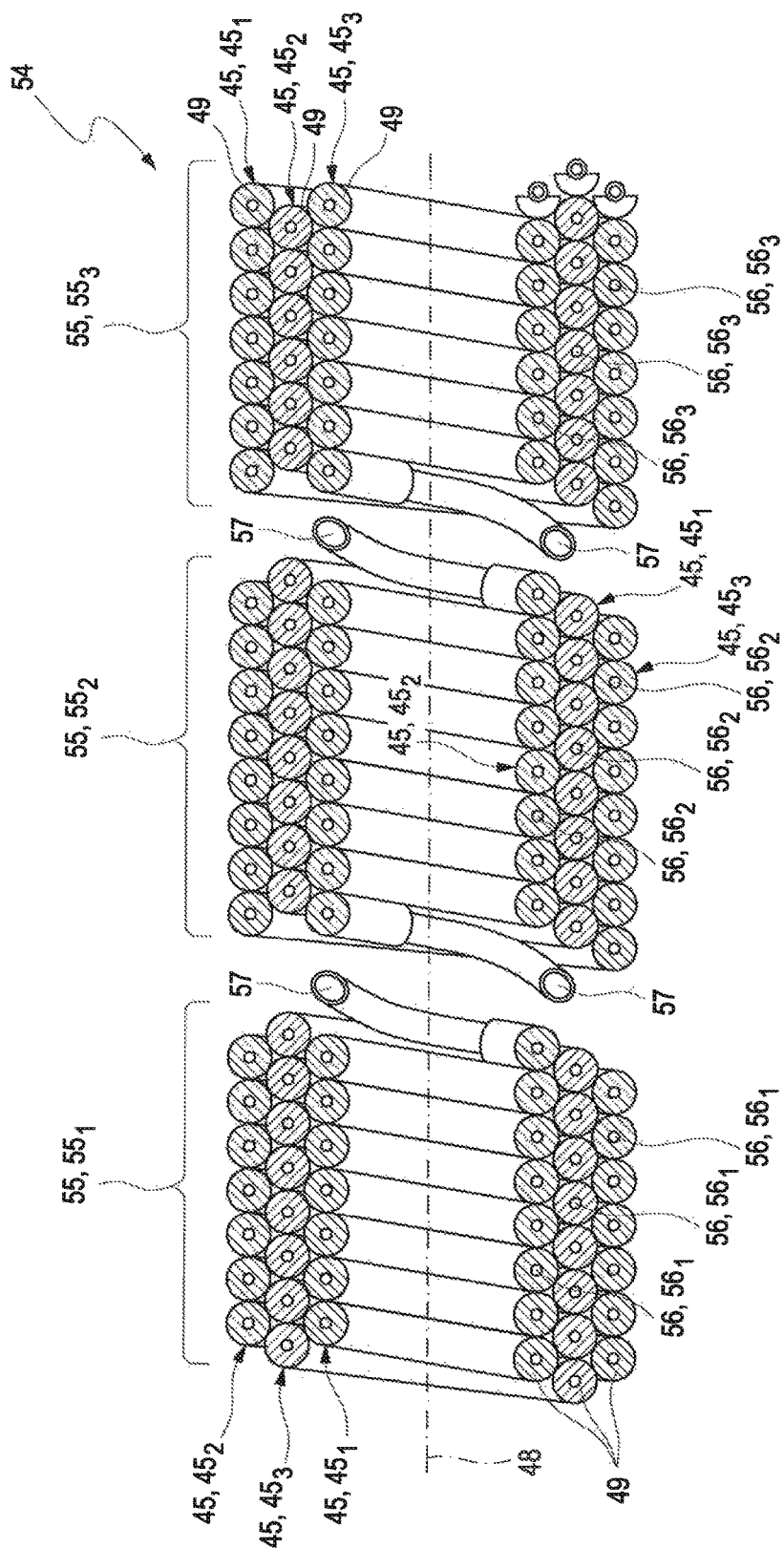
FIG. 7 is a simplified longitudinal sectional view through a coil array with a plurality of coil bundles.

FIG. 7 shows a coil array 54 without tube 32 and without jacket 33, as it can be embodied in the ring channel 34 of another embodiment of heat exchanger 5. The coil array 54 comprises here three coils 45, namely, a first coil $45_1$, a second coil $45_2$ and a third coil $45_3$. The coils 45 form three axially adjacent coil bundles 55, namely, a first coil bundle $55_1$, a second coil bundle $55_2$ and a third coil bundle $55_3$. The axial direction is again defined here by the longitudinal axis 48 of housing 31. A coil section 56, which comprises a plurality of loops 49, extends from each coil 45 within each coil bundle 55. Due to the fact that the coils 45 or the coil sections 56 are arranged as an arrangement comprising a total of three layers, a total of three different radial positions are obtained for the loops 49, namely, a radially inner position, a radially outer position as well as a middle position, which is located radially between the inner and outer positions. The radial position of the corresponding loops 49 within the same coil bundle 55 is the same here within the respective coil section 56. By contrast, the radial positions of the loops 49 of the same coils 45 are different in the different coil bundles 55.

A first coil section $56_1$ of the first coil $45_1$ is arranged radially on the inside in the first coil bundle $55_1$ (shown on the left in FIG. 7) in the example according to FIG. 7, so that all loops 49 of this first coil section $56_1$ assume the inner position. The loops 49 are located on the outside and thus assume the outer position in the first coil section $56_1$ of the second coil $45_2$. The loops 49 in the first coil section $56_1$ are in the middle position in the third coil $45_3$. The three coils 45 in the first coil bundle $55_1$ thus have each a first coil section $56_1$, within which the corresponding loops 49 are each located axially next to each other and are arranged within the same radial position.

The radial positions of the second coil sections $56_2$ are changed in the second coil bundle $55_2$ (shown in the middle in FIG. 7). Thus, the second coil section $56_2$ of the first coil $45_1$ is located in the middle position now. The second coil section $56_2$ of the second coil $45_2$ is located in the inner position now and the second coil section $56_2$ of the third coil $45_3$ is located in the outer position now.

The radial positions of the corresponding third coil sections $56_2$ are transposed again in the third coil bundle $55_3$ (shown on the right in FIG. 7). Thus, the third coil section $56_3$ of the first coil $45_1$ is located in the outer position now. The third coil section $56_3$ of the second coil $45_2$ is located in the middle position now and the third coil section $56_3$ of the third coil $45_3$ is located in the inner position now.

According to FIG. 7, a connection tube 57, which fluidically connects a coil section 56 of one coil bundle 55, which said coil section 56 is located radially farther outside, with a coil section 56 of the respective other coil bundle 55, which said coil section 56 is located radially farther inside, may be provided for each coil 45 between adjacent coil bundles 55.

Figure 8:
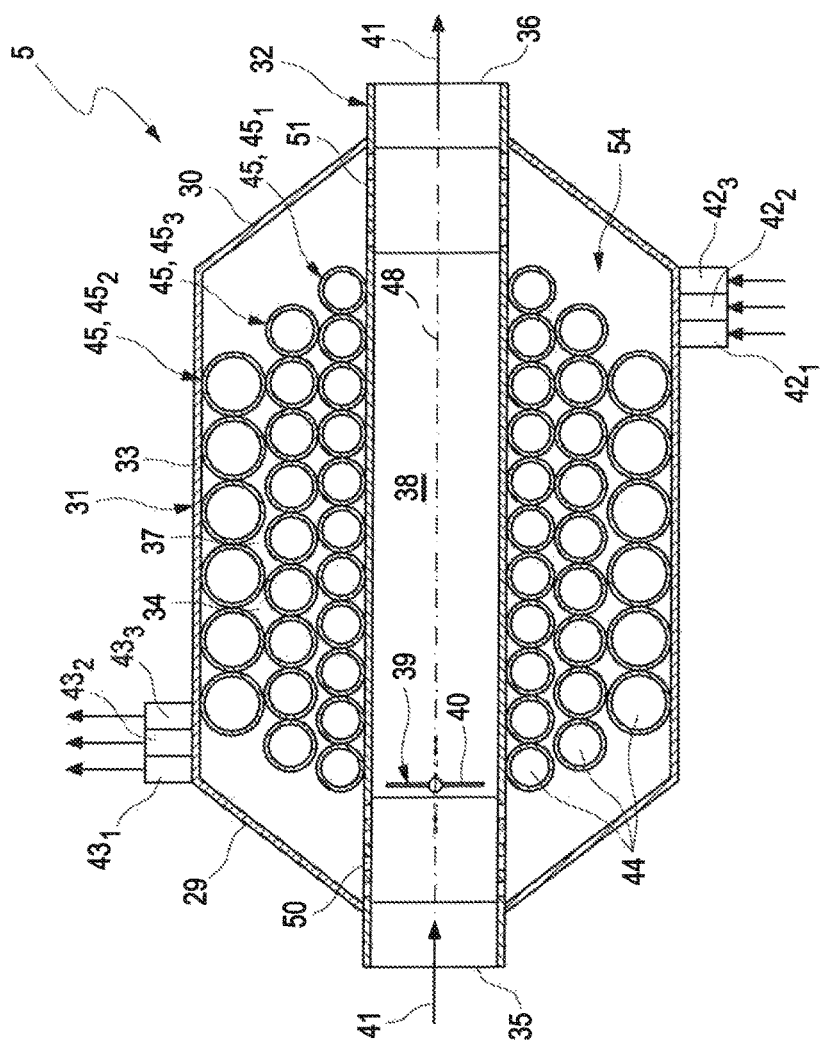
FIG. 8 is a highly simplified longitudinal sectional view through the heat exchanger showing one embodiment.
Figure 9:
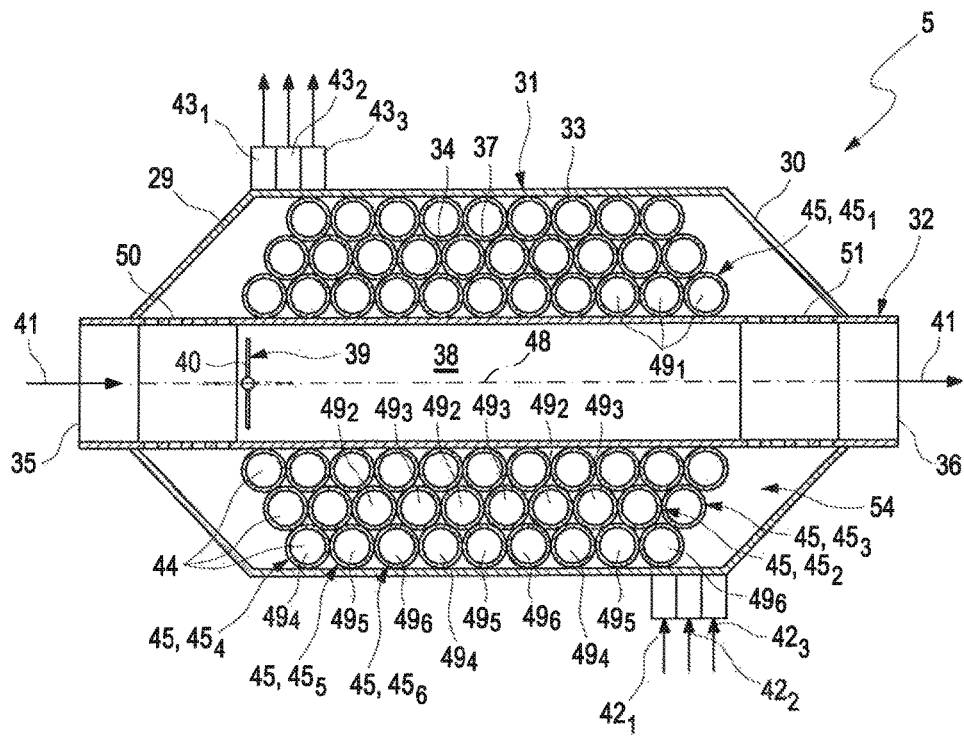
FIG. 9 is a highly simplified longitudinal sectional view through the heat exchanger showing another embodiment.

With reference to FIGS. 8 and 9, embodiments in which the coils 45 differ from each other by different heat transfer capacities, will now be explained as examples. These embodiments may be combined quasi as desired with the above and following embodiments.

FIG. 8 shows, for example, an embodiment in which the individual coils 45 differ from one another by different cross sections through which flow is possible. For example, the coils 45 shown in FIG. 8 thus show an increasing cross section through which flow is possible with increasing radial distance from tube 32. The cross sections through which flow is possible are constant within the respective coil 45 and within the respective coil section 56. According to FIG. 8, the inner coil $45_1$ has the smallest cross section through which flow is possible, while the outer coil $45_2$ has the largest cross section through which flow is possible. The coil $45_3$ in the middle has a medium cross section through which flow is possible. Furthermore, provisions are made in the embodiments according to FIGS. 8 and 9 for the coils 45 to differ from one another by a difference in the number of loops 49. As can be recognized, the coils 45 and coil sections 56 located farther outside have a smaller number of loops 49 than the coils 45 and coil sections 56 located farther inside. Thus, for example, the inner coil $45_1$ has the largest number of loops, while the outer coil $45_2$ has the smallest number of loops. Coil $45_3$ arranged in the middle has a medium number of loops.

Other measures, which affect the heat transfer capacity of the coils 45, are, for example, the use of different materials for the coils 45 and for the spiral tubes 46 and the cooling fins 47. Furthermore, the cooling fins 47 may also differ from one another in terms of their size and/or in terms of the density with which they are arranged and/or in terms of their geometry. The use of different materials leads to different coefficients of thermal conductivity. The measures mentioned may be combined with one another as desired. The goal of the different heat transfer capacity within the different coils 45 is the most homogeneous heat transfer possible from the primary medium to the secondary medium.

All coils 45 are arranged exclusively radially one over the other in the embodiment shown in FIG. 8 as well as in the variants according to FIGS. 3 through 5 and 7. As a consequence, loops 49 that are axially adjacent to each other in the same radial position belong to the same coil 45 or to the same coil section 56 if the coils 45 are divided into coil bundles 55. The coil array 54 that is a three-layer arrangement in the radial direction will thus also comprise three coils 45 only.

Contrary to this, FIG. 9 shows an embodiment in which the coil array 54, which is a three-layer arrangement in the radial direction, comprises more than three coils 45, namely, six coils 45. A first coil $45_1$ is located radially on the inside, i.e., in the inner position. All loops 49 of this first coil $45_1$ are first loops $49_1$ now, which are axially adjacent to one another. A second coil $45_2$ and a third coil $45_3$, which have second and third loops $49_2$ and $49_3$, which alternate with one another in the axial direction, are located in the middle position. The two coils $45_2$ and $45_3$ are arranged such that they are axially intertwined in one another in the manner of a double coil. Second loops $49_2$ and third loops $49_3$ are correspondingly arranged alternatingly axially next to one each other. Even as many as three coils 45, namely, a fourth coil $45_4$, a fifth coil $45_5$ and a sixth coil $45_6$ are arranged in the outer position in the example shown in FIG. 9. These three coils $45_4$, $45_5$, $45_6$ are arranged axially one in the other in the manner of a triple coil or multiple coil, such that fourth loops $49_4$, fifth loops $49_5$ and sixth loops $49_6$ are arranged axially next to each other and regularly alternate with one another.

Insofar as three or more coils 45 are provided in an embodiment, provisions may be made for assigning two or more coils 45 in parallel to at least one of the secondary paths 44. The cross section through which flow is possible can be enlarged hereby for the respective secondary path 44 or the flow resistance can be reduced. For example, provisions may be made in the embodiment shown in FIG. 9 for the first coil $45_1$ to be assigned to a first secondary path $44_1$, while the second coil $45_2$ and the third coil $45_3$ are assigned to a second secondary path $44_2$ and the fourth coil $45_4$, the fifth coil $45_5$ and the sixth coil $45_6$ are assigned to a third secondary path $44_3$.

In order for the respective secondary fluid, especially the third fluid, to be able to flow in parallel through the individual coils $45_4$, $45_5$, $45_6$ in such an embodiment, a distributor element 52 may be provided according to FIG. 6a, which is connected to the respective secondary inlet $42_3$, especially the third secondary inlet, on the inlet side, and to the three coils $45_4$, $45_5$, $45_6$ on the outlet side. Analogously hereto, a collector element 53 may be provided according to FIG. 6b, which is connected to the three coils $45_4$, $45_5$, $45_6$ on the inlet side and to the respective secondary outlet $43_3$, especially the third secondary outlet, on the outlet side. The distribution element 52 and the collector element 53 may have, in principle, similar and preferably identical designs.

Such a distributor element 52 may be arranged in the interior of housing 31 and connected with the respective outer secondary inlet 42. It is equally possible to arrange such a distributor element 52 on the outside on housing 31, so that it forms directly the respective secondary inlet 42. A corresponding statement may also be made for the collector element 53, which is arranged either in the interior of housing 31 or is connected with the respective secondary outlet 43 arranged on the outside on housing 31 or is arranged on the outside on housing 31 and forms itself the respective secondary outlet 43.

Figure 10:
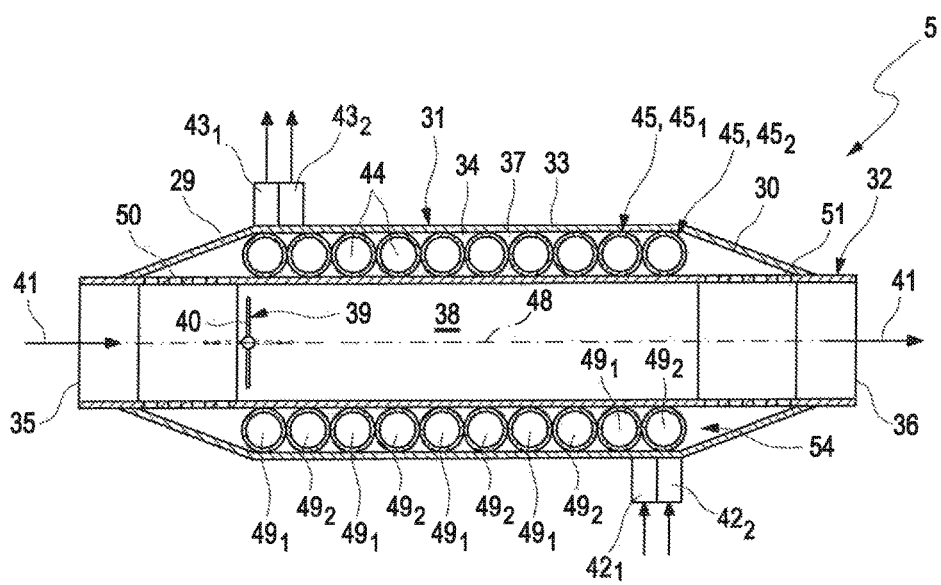
FIG. 10 is a simplified longitudinal sectional view through the heat exchanger showing another embodiment.

FIG. 10 shows an embodiment in which a radially single-layer coil array 54 is provided, wherein the two coils 45 shown are arranged in the ring channel axially one in the other, so that the loops 49 of different coils 45 are located axially next to each other here as well. Since only two coils 45 are provided here, the coil array 54 has the shape of a double coil. Since all coils 45 in the ring channel 34 are intertwined axially in one another, all loops 49 of all coils 45 are in the same radial position, and they are directly adjacent to both tube 32 and jacket 33.

The phrase "directly adjacent" is defined in this connection such that no other loops, coil sections or coils are arranged between the respective loops 49 or respective coils 45 or the respective coil section 56, whereas contacting with the tube 32 or with the jacket 33 is not necessary. Provisions may rather even be made for the loops 49 located on the inside to be in contact with tube 32 via a thermal insulator. In addition or as an alternative, the outer loops 49 may be in contact with the jacket 33 via a thermal insulator. A corresponding statement will thus also apply to the one layer of the single-layer configuration according to FIGS. 10 and 13. In addition or as an alternative to an insulation located on the outside, a mount may be provided, which is supported at jacket 33, on the one hand, and at the respective coil 45 or at the coil array 54, on the other hand, in order to fix the coil 45 or the coil array 54 axially in jacket 33. The mount may be specially advantageously a thermally insulating mount, e.g., in the form of a mounting mat. An outer insulation 60 and a mount 61 can be recognized in FIG. 14.

Figure 11:
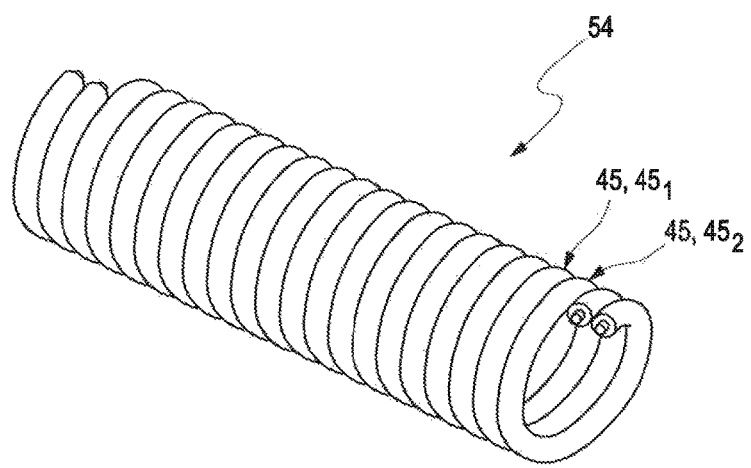
FIG. 11 is an isometric view of a coil array of the heat exchanger from FIG. 10.
Figure 12:
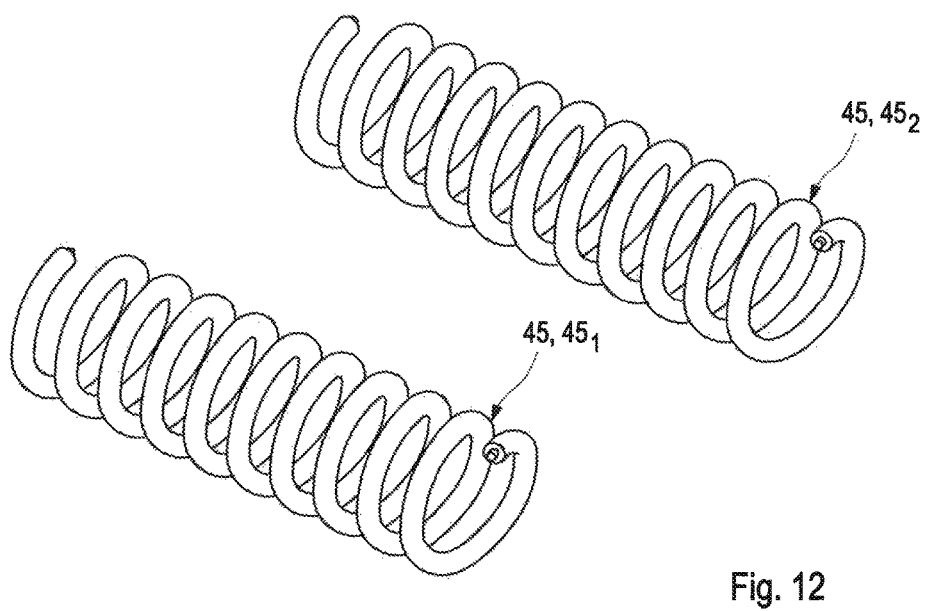
FIG. 12 is an isometric exploded view of the coil array from FIG. 11.

According to FIGS. 11 and 12, the two coils 45 may be arranged intertwined axially in one another according to a double coil. The individual coils 45 may have an identical design here.

Figure 13:
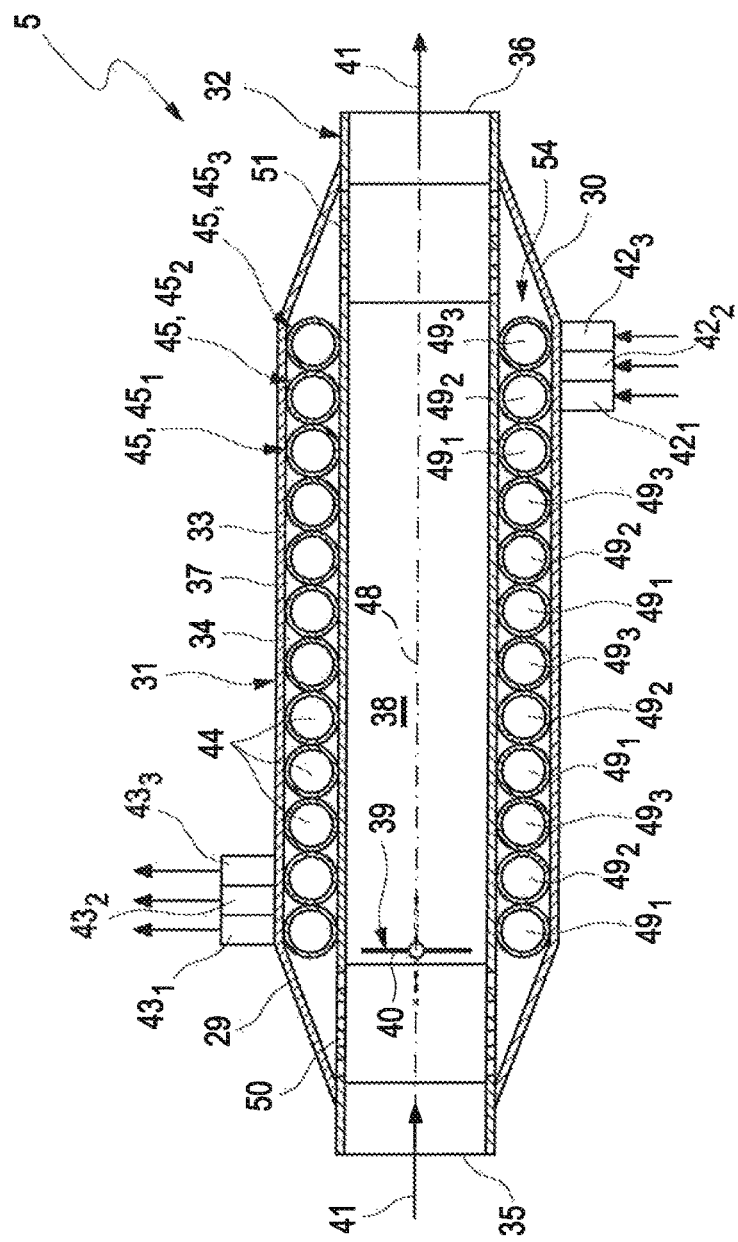
FIG. 13 is a simplified longitudinal sectional view of the heat exchanger in another embodiment.

FIG. 13 shows a variant of the heat exchanger from FIG. 10, in which the coil array 54 comprises, purely as an example, not only two coils 45, but three coils 45, which are axially intertwined in one another in the manner of a triple coil, so that the loops 49 of different coils 45 are located axially next to each other here as well.

Figure 14:
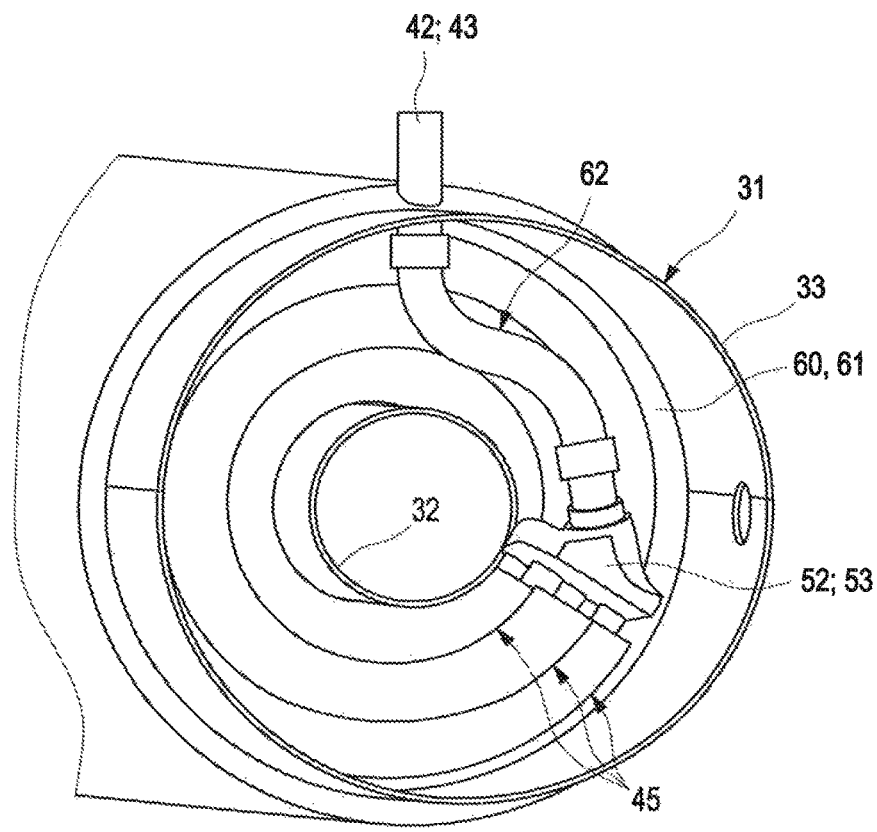
FIG. 14 is an isometric sectional view of the heat exchanger in the area of an uncoupling element.

Corresponding to FIG. 14, the respective coil 45 is connected fluidically with the housing-side secondary port, i.e., with the secondary inlet 42 or with the secondary outlet 43, via an uncoupling element 62, i.e., indirectly, rather than directly according to a preferred embedment. The respective uncoupling element 62 is arranged in the interior of housing 31. It is movable and flexible and can compensate relative motions between the respective coil 45 and housing 31 or jacket 33. Such relative motions may occur, for example, because of different coefficients of thermal expansion of the jacket 33 and of the respective coil 45. The uncoupling element 62 may be configured, for example, as a metal corrugated hose or spiral wound metal hose. It may have a radially single-layer or multilayer structure. It may have an elastic protective layer on the inside and/or on the outside, which covers the corrugated structure of the corrugated hose. Such a protective layer may be designed, e.g., as a clip. In the example according to FIG. 14, the uncoupling element 62 is fluidically connected with the respective secondary port 42, 43 at one end and with a distributor element 52 or with a collector element 53 at the other end, which is in turn connected fluidically, purely as an example, with three coils 45 in FIG. 14.

While specific embodiments of the invention have been shown and described in detail to illustrate the application of the principles of the invention, it will be understood that the invention may be embodied otherwise without departing from such principles.

What is claimed is:

1. A heat exchanger comprising:
    a housing comprising a tube and a jacket, which surrounds the tube, the jacket and the tube forming a ring channel;
    a primary inlet and a primary outlet, which are fluidically connected with one another via a primary path carrying a primary medium through the ring channel and via a bypass path carrying the primary medium through tube; and
    a control controlling the flow of the primary medium through the primary path and the bypass path;
    two separate secondary inlets and at least two separate secondary outlets, each of the secondary inlets being fluidically connected with one of the two separate secondary outlets via one of two separate secondary paths or carrying at least one secondary medium, wherein:
    the primary path is coupled with the secondary paths in a heat transferring manner and such that the media are separated.

2. A heat exchanger in accordance with claim 1, wherein the housing is a common housing that includes, for the respective secondary medium, a separate secondary inlet forming one of the two separate secondary inlets, a separate secondary outlet forming one of the two separate secondary outlets and one of the secondary paths for carrying the respective secondary medium, which fluidically connects the respective separate secondary inlet with the respective separate secondary outlet.

3. A heat exchanger in accordance with claim 1, wherein:
    one of the secondary paths is formed by a coil arranged in the ring channel which winds helically around the tube; and
    another of the secondary paths is formed by another coil arranged in the ring channel which winds helically around the tube.

4. A heat exchanger in accordance with claim 3, wherein each coil carries the secondary medium on the inside and carries cooling fins exposed to the primary medium on the outside.

5. A heat exchanger in accordance with claim 3, wherein the coil and the another coil are arranged radially one over the other in the ring channel.

6. A heat exchanger in accordance with claim 5, wherein:
    the coil and the another coil each form at least two axially adjacent coil bundles in which a coil section comprising a plurality of loops extends from each coil;

a radial position of each of loops of the respective coil sections is the same within the same coil bundle; and a radial positions of the loops of the same coils in the adjacent coil bundles are different.

7. A heat exchanger in accordance with claim 6, wherein:

for n number of coils at least n coil bundles are provided, in which n different radial positions are possible for each loop; and the loops of the coil sections assume every possible radial position at least once for each coil.

8. A heat exchanger in accordance with claim 6, wherein:

a connection tube fluidically connects a coil section of one coil bundle, which coil section is located radially farther on an inside, with a coil section of the other coil bundle, which latter coil section is located radially farther on the outside, is provided for each coil between adjacent coil bundles.

9. A heat exchanger in accordance with claim 3, wherein the coils differ from each other by different heat transfer capacities.

10. A heat exchanger in accordance with claim 9, wherein at least one of:

the coil and the another coil differ from each other by different cross sections through which flow is possible;

the coil and the another coil differ from each other by a difference in a number of loops; and the coils differ from each other by different materials.

11. A heat exchanger in accordance with claim 4, wherein at least one of:

the coil and the another coil differ from each other by a difference in the size of the cooling fins;

the coil and the another coil differ from each other by a difference in a number of cooling fins per unit length;

the coil and the another coil differ from each other by a difference in a geometry of the cooling fins; and the coil and the another coil differ from each other by a difference in a material of the cooling fins.

12. A heat exchanger in accordance with claim 5, wherein:

the coil and the another coil are arranged radially one over the other, or the coil and the another coil are arranged axially one in the other at least in a position located radially farther on the outside, whereby loops of different coils are arranged axially next to each other.

13. A heat exchanger in accordance with claim 3, wherein:

the coil and the another coil in the ring channel are arranged axially one in the other, whereby loops of different coils are arranged axially next to each other.

14. A heat exchanger in accordance with claim 1, further comprising an uncoupling element wherein at least one of the coil and the another coil is connected fluidically with the secondary inlet or with the secondary outlet via the uncoupling element.

15. A device comprising:

an internal combustion engine comprising combustion chambers, a fresh air feed unit feeding fresh air to combustion chambers of the internal combustion engine and an exhaust system for removing exhaust gas from the combustion chambers, and at least one of an exhaust gas-recirculating unit for recirculating exhaust gas from the exhaust system to the fresh air feed unit; and no exhaust gas-recirculating unit for recirculating exhaust gas from the exhaust system to the fresh air feed unit;

a first cooling circuit in which a first cooling medium circulates;

a second cooling circuit in which a second cooling medium circulates; and a exchanger comprising a housing comprising a tube and a jacket, which surrounds the tube, the jacket and the tube forming a ring channel, a primary inlet and a primary outlet, which are fluidically connected with one another via a primary path carrying a primary medium through the ring channel and via a bypass path carrying the primary medium through tube, a control controlling the flow of the primary medium through the primary path and the bypass path, two separate secondary inlets and at least two separate secondary outlets, each of the secondary inlets being fluidically connected with one of the two separate secondary outlets via one of two separate secondary paths or carrying at least one secondary medium, wherein the primary path is coupled with the secondary paths in a heat transferring manner and such that the media are separated, wherein:

the primary path is integrated into the exhaust gas-recirculating unit, whereby the exhaust gas or the recirculated exhaust gas forms the primary medium;

at least one first secondary path is integrated into the first cooling circuit, whereby the first cooling medium forms the first secondary medium; and a second secondary path is integrated into the second cooling circuit, whereby the second cooling agent forms the second secondary medium.

16. A device in accordance with claim 15, wherein at least one of:

the at least two cooling circuits are designed for different temperature levels;

the first cooling circuit cools or heats the internal combustion engine and the second cooling circuit heats an air flow for air conditioning a passenger compartment of the vehicle or to cool or heat lubricating oil; and one of the cooling circuits is formed by a waste heat utilization circuit of a waste heat utilization unit, in which a working medium circulates and thus forms the cooling medium of the respective cooling circuit.

* * * * *